United States Patent [19]

Kleijne

[11] Patent Number: 5,379,290
[45] Date of Patent: Jan. 3, 1995

[54] WIRELESS LOCAL AREA NETWORK TRANSMISSION SYSTEM

[75] Inventor: Theodoor A. Kleijne, Leersum, Netherlands

[73] Assignee: NCR Corporation, Dayton, Ohio

[21] Appl. No.: 9,482

[22] Filed: Jan. 25, 1993

[30] Foreign Application Priority Data

Aug. 14, 1992 [GB] United Kingdom ............... 9217374

[51] Int. Cl.$^6$ ........................... H04J 3/16; H04J 3/26
[52] U.S. Cl. .................. 370/85.2; 370/85.3; 370/92
[58] Field of Search .............. 370/85.1, 85.2, 85.3, 370/85.7, 95.1, 95.2, 32.1, 92; 371/32, 33; 340/825.5, 825.51; 375/7, 8; 455/58.1, 58.2, 34.1

[56] References Cited

U.S. PATENT DOCUMENTS

| | | | |
|---|---|---|---|
| 4,500,990 | 2/1985 | Akashi | 370/85.3 |
| 4,598,285 | 7/1986 | Hoshen | 340/825.5 |
| 4,797,879 | 1/1989 | Habbab et al. | 370/94.1 |
| 4,807,222 | 2/1989 | Amitay | 370/85.3 |
| 4,970,715 | 11/1990 | McMahan | 370/32.1 |
| 4,998,245 | 3/1991 | Tanaka et al. | 370/95.1 |
| 5,040,175 | 8/1991 | Tuch et al. | 370/85.2 |
| 5,124,991 | 6/1992 | Allen | 371/32 |
| 5,142,533 | 8/1992 | Crisler et al. | 370/85.2 |

FOREIGN PATENT DOCUMENTS 0294133 12/1988 European Pat. Off.
8911126 11/1989 WIPO.

OTHER PUBLICATIONS

Abstract of Japanese Patent Application No. 63-18776; Patent Abstracts of Japan; vol. E-690, p. 102.

Primary Examiner—Douglas W. Olms
Assistant Examiner—Chau T. Nguyen
Attorney, Agent, or Firm—Elmer Wargo

[57] ABSTRACT

In a method of operating a wireless local area network (10), a transmitting station (12) senses that the medium is free and then transmits a first portion (43) of a message (40), including destination and source addresses. Message transmission is then interrupted for a response window period (53) during which a destination station (12) should transmit a response message 42 also containing said source and destination addresses. If the transmitting station (12) does not receive a correct response message (42) then it transmits a JAM signal during a JAM window (65) following the response window (53), thereby indicating to all stations (12) that a collision has occurred. All stations not transmitting a JAM signal monitor the JAM window (65) and are thus informed whether or not a collision has been detected.

8 Claims, 4 Drawing Sheets

WIRELESS LOCAL AREA NETWORK TRANSMISSION SYSTEM

BACKGROUND OF THE INVENTION

1. Field of Invention

This invention relates to a method of controlling the operation of a wireless local area network.

The invention also relates to a wireless local area network including a plurality of wireless local area network stations.

2. Background Information

Various methods are known for sharing network communication channels or links among stations in a local area network. One widely used method is known as CSMA/CD (carrier sense multiple access with collision detection). According to this known method, a station wishing to transmit a message listens until the transmission channel is idle before commencing to transmit an information packet. Furthermore, the station continues to listen to the channel after commencing a transmission, and if a collision is detected, that is, more than one station has commenced to transmit an information packet, any station which detects such collision terminates its message transmission and transmits a jam pattern (or garble) such that all other stations can be informed of the collision, terminate message transmission, and wait a random time before attempting to commence a further message transmission.

The CSMA/CD protocol is the subject of an international (ISO) standard and corresponding IEEE Standard, No. 802.3, and has become a generally used protocol for LANs utilizing wired connections for transmission between the stations. In consequence, CSMA/CD LAN controller chips have become widely commercially available. Several manufacturers produce such chips, complying with the IEEE 802.3 standard. An example is the Intel 82586 LAN coprocessor chip, available from Intel Corporation of Santa Clara, Calif., U.S.A. Such chips provide various facilities useful in LANs such as data rate range and a backoff algorithm and configurable parameters such as slot time duration, retry counter offset and limit, and interframe spacing time.

LANs using wired interconnections have the disadvantage that extensive cabling is required to interconnect the stations. The provision of such cabling is generally inconvenient and gives rise to inflexibility if it is desired to alter the physical locations of the stations. It has been proposed to utilize a wireless transmission link to replace the cabling interconnections of a LAN. However, if only a single wireless channel is to be utilized for such a LAN, the normal CSMA/CD protocol cannot generally be applied as in a cable-connected LAN since the transmission and the reception of signals take place on the same channel and a station cannot generally receive (or listen) while it is transmitting because the dynamic range is too large.

SUMMARY OF THE INVENTION

It is an object of the present invention to provide a method of controlling a wireless local area network wherein collisions may be detected in a simple and effective manner.

Therefore, according to one aspect of the present invention, there is provided in a wireless local area network (LAN) including a plurality of stations operating on a wireless communication channel (WCC), a method of controlling the operation of said wireless LAN comprising the steps of:

(a) transmitting over said WCC an initial message portion of a message to be transmitted by a first (transmitting) station of said plurality of stations to a second (destination) station of said plurality of stations;

(b) said second station, in response to receiving said initial message portion, transmitting a response message over said WCC; and (c) said first station transmitting over said WCC a predetermined signal if said response message is not received by said first station.

In another aspect of the present invention there is provided a wireless local area network (LAN) comprising:

a plurality of wireless LAN stations having operating means for operating over a wireless communication channel (WCC) in said LAN for sending and transmitting a message thereover;

said message including an initial message portion and a remaining message portion;

said operating means comprising:

a first modem means for a first station of said plurality of said wireless LAN stations for transmitting said initial message portion over said WCC; and a second modem means for a second station of said plurality of said wireless LAN stations for receiving said initial message portion over said WCC and for transmitting a response message over said WCC;

said first modem means transmitting a predetermined signal over said WCC if said response message is not received by said first station.

It will be appreciated that in a method according to the invention, the transmission of the predetermined signal identifies the failure to receive a correct response message, which arises if a collision has occurred on the wireless transmission channel.

According to yet another aspect of the present invention, there is provided in a wireless local area network (LAN) including a controller and a plurality of stations operating on a wireless communication channel (WCC), a method of controlling the operation of said wireless LAN comprising the steps of:

(a) transmitting by a first station of said plurality of stations over said WCC an initial message portion including a training portion, an address of said first station, and an address of a second station in said plurality of stations designated for receiving said initial message portion; and said first station (b) checking a response message transmitted by said second station and received by said first station in a first time period following the transmission of said initial message portion to determine if said response message is identical to said initial message portion; and said first station (c) remaining in a receive mode during a second time period following said first time period if said response message is identical to said initial message portion, permitting said first station to detect a jam pattern transmitted by other stations in said plurality of stations during said second period.

The above advantages, and others, will be more readily understood in connection with the following specification, claims, and drawing.

DETAILED DESCRIPTION OF THE PREFERRED EMBODIMENT

Figure 1:
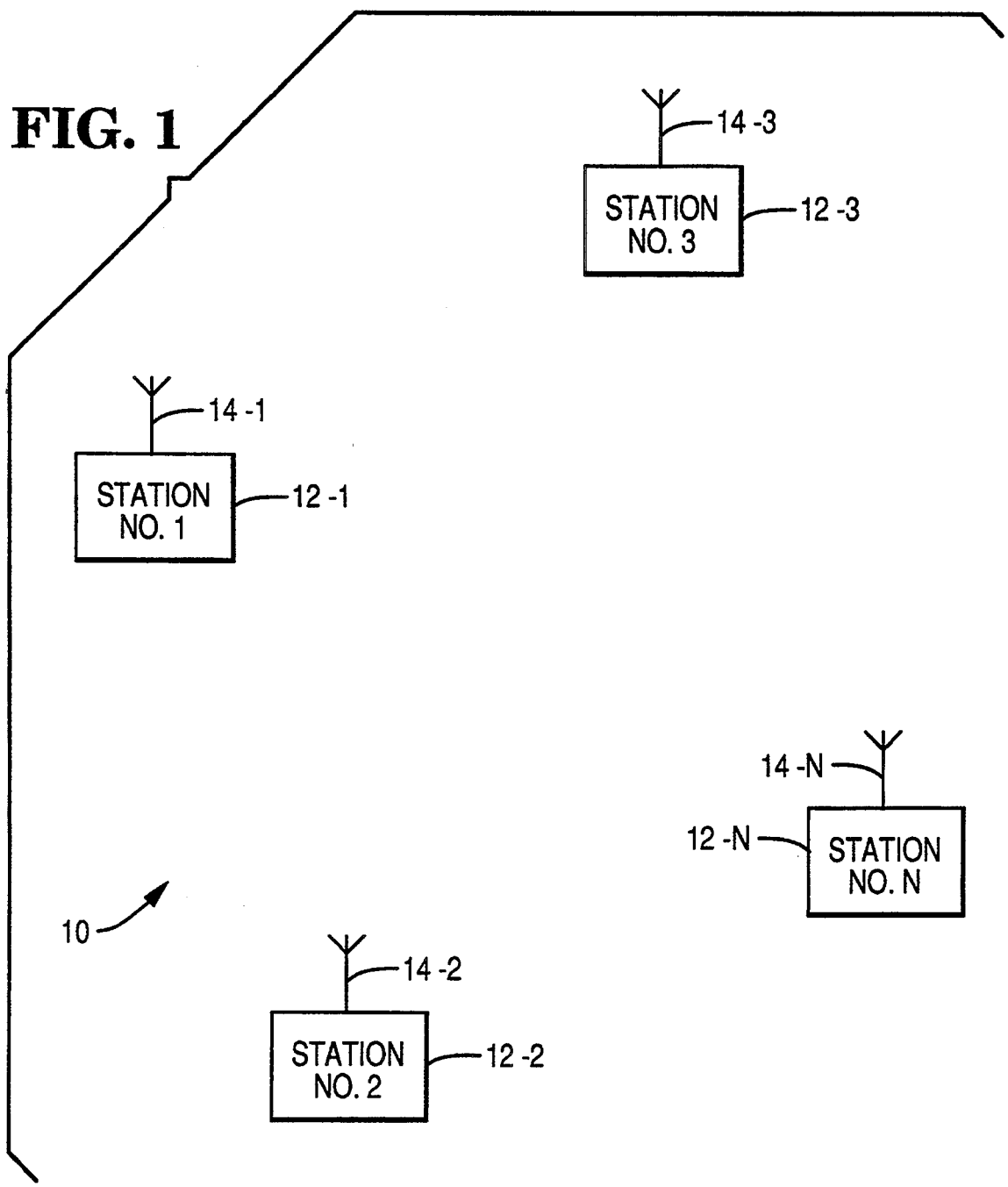
FIG. 1 is a diagram of a wireless local area network.

Referring first to FIG. 1, there is shown a wireless local area network (LAN 10) including a plurality N of data processing stations 12, shown individually as stations 12-1 to 12-N. Each station 12 has an antenna 14, shown individually as antennas 14-1 to 14-N. The stations 12 communicate with one another over a common single wireless communication channel. It is assumed that each station is in the coverage area of all the other stations, that is, each station 12 can receive the transmissions from any other station 12.

Figure 2:
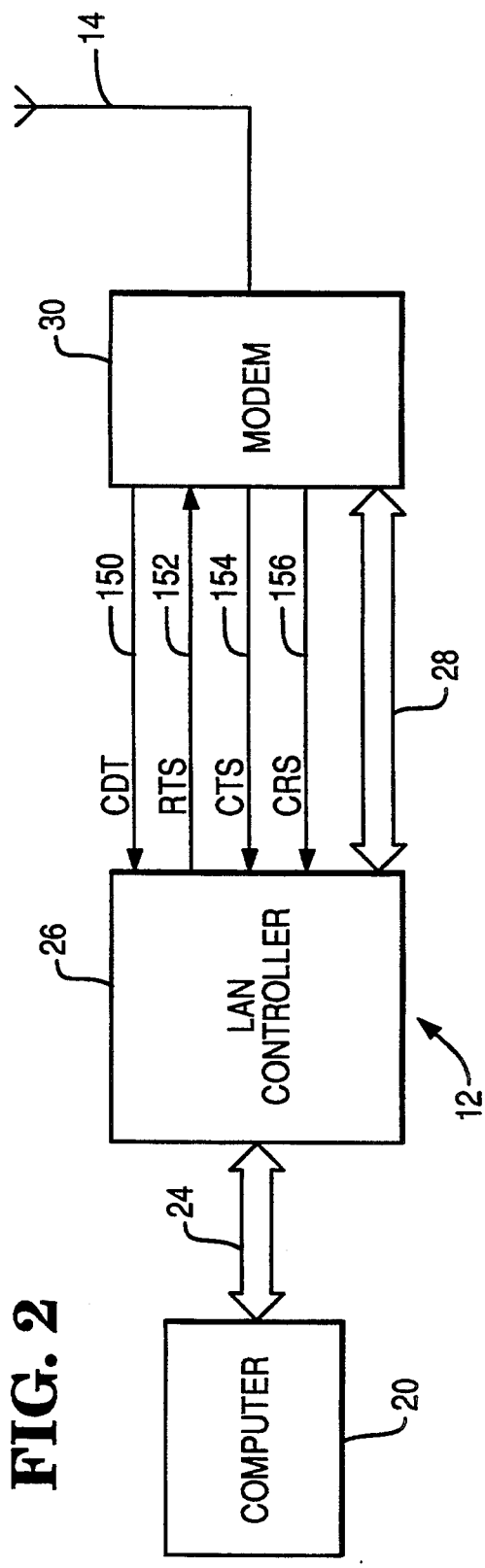
FIG. 2 is a block diagram illustrating the construction of a station included in the network of FIG. 1.

Referring now in FIG. 2, there is shown a simplified block diagram of a typical station 12. The station 12 includes a computer 20, such as a personal computer (PC), connected via a bus 24 to a LAN (local area network) controller 26. The LAN controller 26 may be a commercially available LAN controller device, suitable for the well known CSMA/CD (carrier sense multiple access with collisions detection) protocol. For example, the LAN controller 26 may be an Intel 82586 LAN Coprocessor chip available from Intel corporation of Santa Clara, Calif., U.S.A. The LAN controller 26 is connected via a bus 28, which carries data and control signals, to RF modem 30 which is coupled to the antenna 14, and which provides a modulated RF signal for transmission over the wireless communication channel.

Figure 3:
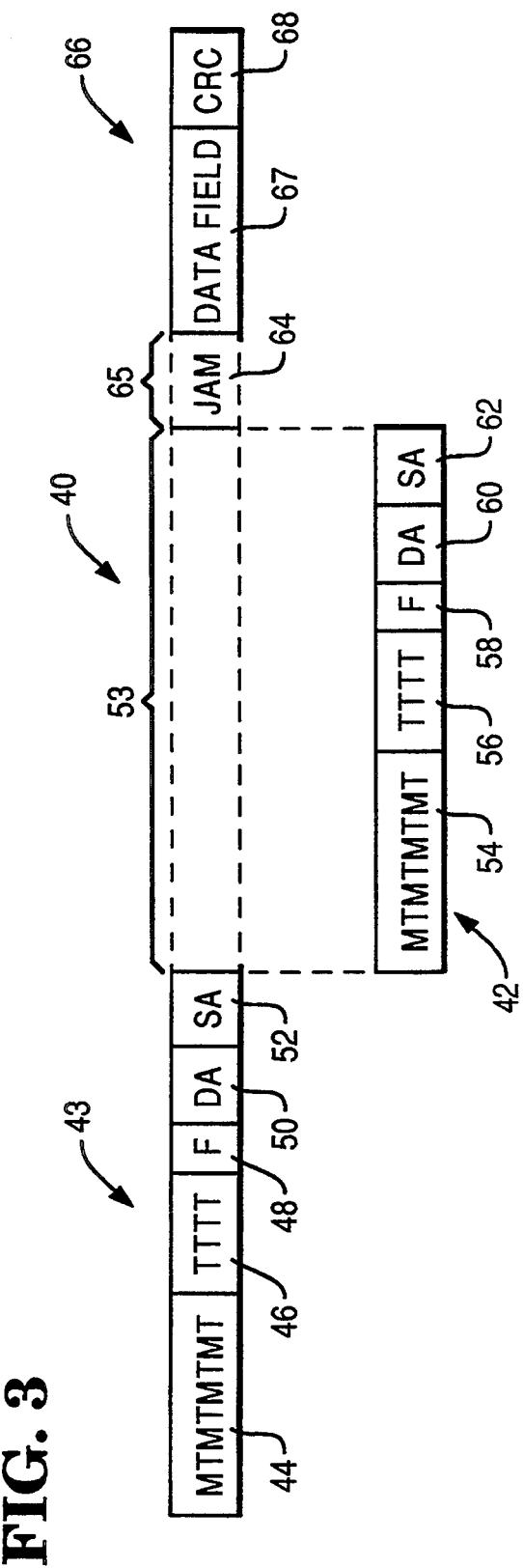
FIG. 3 is a diagram of a transmitted message and a response message utilized in the operation of the network of FIG. 1.

The concept underlying the present invention will best be appreciated by consideration of the following overview. Referring to FIG. 3, there is shown an illustration of the format of a transmitted message 40 in the upper part of the FIG. 3, and in the lower part, the format of a response message 42. Assume by way of example, that a source station such as station, 12-1, desires to transmit a message to a destination station such as station 12-2. The station 12-1 first senses that the transmission medium is free and if so, commences to transmit the message 40.

The message 40 includes a first portion 43 which includes a first training portion 44 during which a training signal MT (modem training) is transmitted, followed by a second training portion 46, during which a further training signal T is transmitted, in line with a message format in accordance with IEEE Standard 802.3. It should be understood that the additional first training portion 44 is needed since a wireless (e.g. radio) transmission modem needs a longer training signal than a wired (cable) connected modem. Next, the first portion 43 of the transmitted message 40 continues with a flag (F) portion 48, a destination address (DA) 50 and a source address (SA) 52, all again in accordance with IEEE Standard 802.3.

The transmitting station 12-1 now stops transmitting and switches to the receive mode for a response window time period 53. The destination station 12-2 should now respond by transmitting a response message 42. The response message includes a first training portion 54, a second training portion 56, a flag 58, an address 60 which is the same address DA as the originally transmitted destination address 50 and an address 62 corresponding to the source address (SA) 52. It will be appreciated that the address 60 in the response message 42 is the address of the destination of the response message 42, i.e. the source of the originally transmitted message portion 43.

The source station 12-1 (FIG. 1) examines the response message 42. If the source station 12-1 does not detect the correct source and destination addresses SA and DA in the response message 42, then the source station 12-1 proceeds to transmit a JAM pattern 64 in a JAM window time period 65 which follows the response window 53. In the preferred embodiment, the JAM pattern 64 is a repeated on-off modulation of the carrier signal. If the source station 12-1 does detect the correct source and destination addresses SA and DA then the source station 12-1 remains in the receive mode during the JAM window 65, allowing the detection of a JAM pattern transmitted by other stations. If a JAM pattern 64 is detected in the JAM window 65, then the modem 30 concludes that a collision has occurred and transmits a collision detect signal CDT over a line 150 to the LAN controller 26 in that station. In known manner this causes transmission to cease and a retry after a random back-off period. If a JAM pattern is not detected in the JAM window 65, then the station 12-1 proceeds to transmit the remaining portion 66 of the message 40, including the data field 67, and a CRC check portion 68.

It should be understood that although each station 12 senses that the wireless medium is free before commencing to transmit, there is a small probability that two (or more) stations 12 may commence to transmit at approximately the same time, giving rise to a collision on the transmission medium. With the described arrangement, it will be appreciated that even if a source station 12 has captured the wireless transmission medium, such that its transmitted message is correctly received at the destination station despite the simultaneous presence of another transmission between stations 12 on the medium, then the said source station 12 will be informed that such a collision has occurred, since a signal will be sensed in the JAM window 65.

Figure 4:
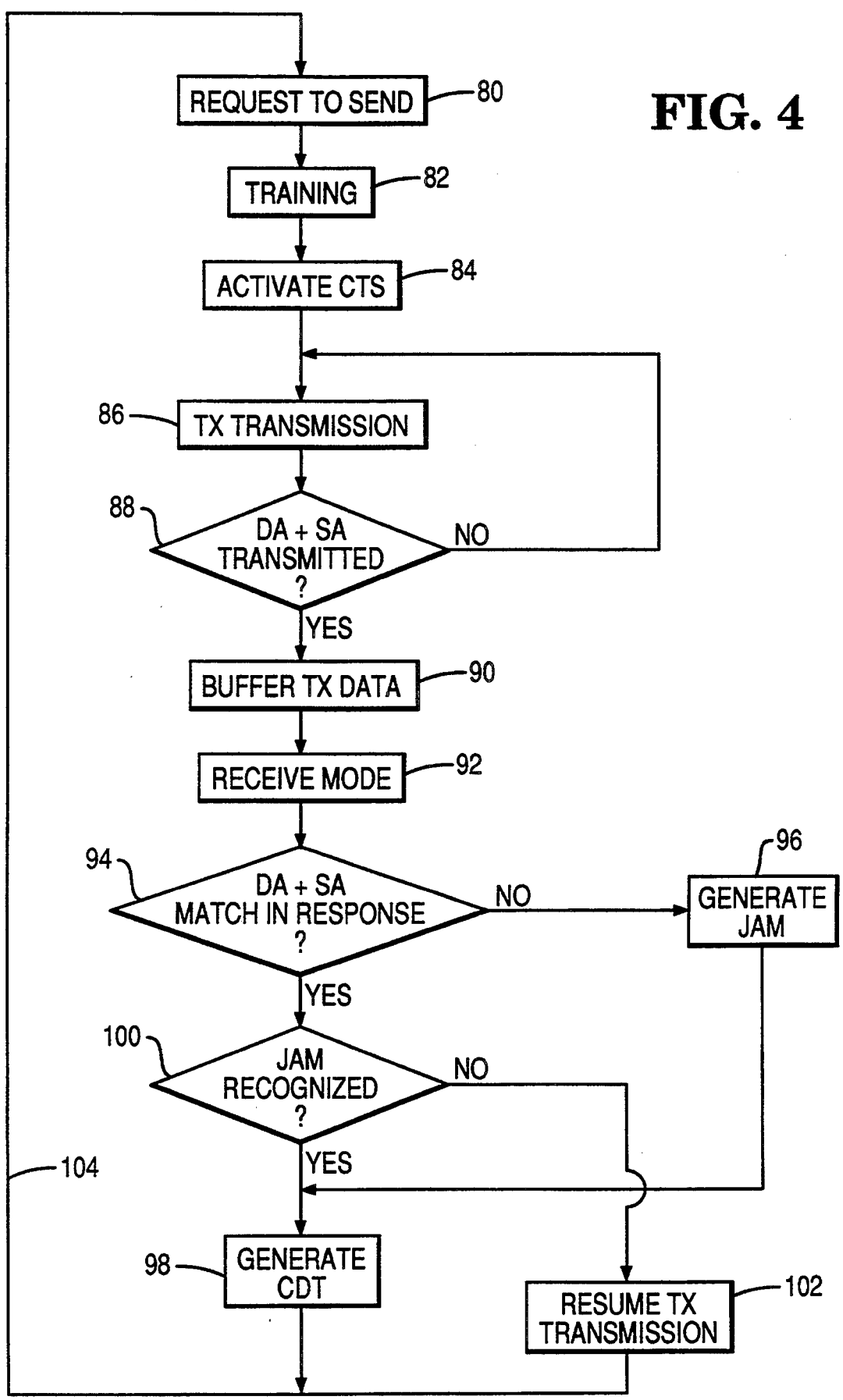
FIG. 4 is a flowchart illustrating a state diagram for the transmit mode of a station.

The operation of typical stations 12 in transmit and receive mode will now be described in more detail. Referring to FIG. 4, there is shown a flowchart representing a state diagram for the operation of a source station, that is, a station transmitting a message. As shown at step or box 80, the LAN controller 26 initially transmits a request-to-send (RTS) signal over a line 152 to the modem 30. The modem 30 senses if the wireless channel is free and if so, starts transmission of the first and second training portions 44 and 46, (FIG. 3) (box 82) and activates a clear-to-send (CTS) signal on a line 154 to the LAN controller 26, as shown in box 84. Following transmission of the training signals, the modem 30 then transmits the first portion 43 of the message 40 (FIG. 3), including the destination and source addresses DA and SA, as shown in boxes 86 and 88, the transmitted data being buffered in the modem 30, as shown in box 90. The modem 30 then interrupts the transmission and switches to the receive mode, as shown in box 92, for the duration of the response window 53, referred to hereinabove.

In the preferred embodiment, the transmission interruption is effected by deactivating the CTS signal from the modem 30 to the LAN controller 26. Alternatively, the data may be buffered in the modem 30, although this arrangement requires that the message must not be so short that transfer thereof from the LAN controller 26 to the modem 30 is completed before the conclusion of the JAM window 65, since the LAN controller 26 would conclude that the message had been fully successfully transmitted. In other words, in the alternative arrangement the minimum message length, which is stored as a parameter in the LAN controller 26, must be set such that the message transfer is not completed during the response window 53 of the JAM window 65.

During the response window 53, the modem 30 processes any received data. If the correct destination address DA and source address SA are not identified in the received data (box 94), a JAM pattern is generated and transmitted in the JAM window (box 96). This informs all stations 12 in the receive mode during the JAM window 65, this is, all stations not themselves transmitting a JAM pattern 64, that a collision has been detected. The modem 30 then generates a collision detect signal (CDT), see box 98 in FIG. 4, the CDT signal being applied via the line 150 to the LAN controller 26 to abort the transmission and enable a retry after a random backoff period, as mentioned hereinabove.

If the correct destination address DA and source address SA are identified in the received data, then the source station remains in the receive mode and the flowchart continues to box 100 where it is determined whether a JAM pattern 64 is detected during the JAM window 65. If no JAM pattern 64 is detected, the flowchart proceeds to box 102, the modem 30 switches to the transmit mode, and transmits the remaining portion 66 of the message 40 (FIG. 3), whereafter the flowchart returns to the initial state as shown by line 104. If a JAM pattern 64 is detected, a collision detect signal CDT is generated (box 98) and applied to the LAN controller 26, thereby aborting the transmission and enabling a retry after a random backoff period.

Figure 5:
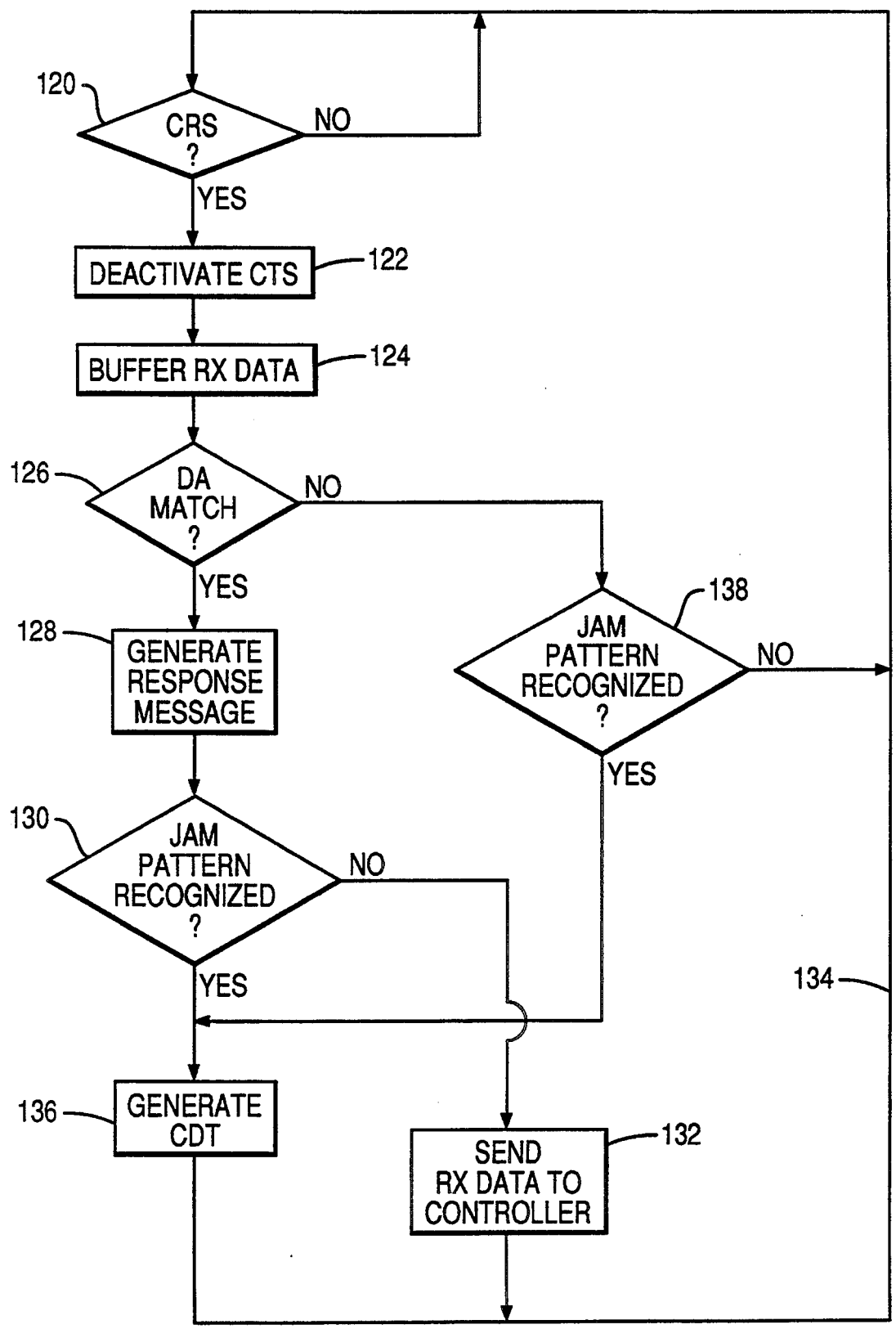
FIG. 5 is a flowchart illustrating a state diagram for the receive mode of a station.

Referring now to FIG. 5, there is shown a flowchart representing a state diagram for the operation of a receiving or destination station 12, that is, a station receiving a message from the wireless transmission channel. Initially, as shown at step or box 120, the modem 30 senses the transmission medium, and if a carrier signal is detected, the modem 30 provides a carrier sense signal CRS over a line 156 (FIG. 2). When this occurs, the signal CTS on the line 154 is deactivated, as shown at box 122, and the modem 30 buffers the received data (box 124). The received data is analyzed, and if the destination station 12 recognizes its own address, that is, there is a DA match, as shown in box 126, the destination station 12 switches to the transmit mode and transmits a response message during the response window 53 (box 128). The station then reverts to the receive mode, and during the JAM window 65 the transmission medium is sensed for the presence of a JAM pattern 64 (box 130). If no JAM pattern 64 is recognized, the received data is sent over the bus 28 to the LAN controller 26 (box 132) and the flowchart returns to the initial state as shown by line 134. If a JAM pattern is recognized, then a collision detect signal CDT is generated and sent to the LAN controller 26 over the line 150 (FIG. 2) as shown in box 136. The flowchart then returns to the initial state over the line 134.

Returning to box 126, if the receiving modem 30 does not recognize its address in the received data, then a response message 42 is not generated, but the JAM window 65 is sensed for a JAM pattern 64 as shown in box 138. If a JAM pattern 64 is sensed, the flowchart proceeds to box 136 and a CDT signal is generated and sent to the LAN controller 26 via the line 150. If no JAM pattern 64 is sensed, the flowchart returns to the initial state directly over line 134.

In the light of the foregoing description, it will be appreciated that during the JAM window 65 all modems 30 (other than those transmitting a JAM pattern) sense the wireless communication channel for a JAM pattern 64. All modems 30 that recognize a JAM pattern during the JAM window 65 will activate a CDT signal to their respective LAN controller 26. As mentioned hereinabove, the JAM pattern 64 is preferably a repeated on-off modulation of the carrier signal. All modems 30 which transmit a JAM pattern transmit the same, synchronized on-off modulation of the carrier signal. This transmitted on-off carrier modulation can be readily identified as a valid JAM pattern 64 by, for example, detecting the durations of the on and off periods of the carrier signal. Such a detection method is effective even if more than one modem 30 is transmitting a JAM pattern 64, since as mentioned the same JAM pattern 64 is transmitted synchronously by all modems which transmit a JAM pattern. Also, such a JAM pattern 64 can be readily recognized even though modems 30 which receive it are optionally adjusted by the training signal contained in a response message, and may not be optionally adjusted to receive a JAM pattern 64 from a modem 30 which transmits such a JAM pattern 64.

Modifications of the described embodiment are possible. In one alternative arrangement, a modem 30 which has transmitted the initial portion 43 of a message 40 (FIG. 3) and which has received a correct response message 42 (FIG. 3) is enabled to continue with transmission of the remaining portion of the message 40 even if a JAM pattern 64 is sensed in the JAM window 65. It will be appreciated that the capture effect in the wireless communication channel may be so strong that a transmitting modem 30 captures the channel and effects a successful transmission despite the existence of another transmission by another modem 30. The effect of this alternative arrangement is that the station which has captured the channel is permitted to continue with its transmission whereas any other station 12 which has transmitted unsuccessfully, will back off its transmission. An advantage of this alternative arrangement is that bandwidth usage is increased since successful transmissions may continue, despite a collision, whereby the bandwidth is optimally used.

It will be appreciated that the described embodiment manifests a performance degradation compared with conventional cable-based CSMA/CD implementations. However, such performance degradation is limited and is acceptable. For example, a CSMA/CD cable-based implementation which has a training period of approximately 200 bits and a message length of 800 bits has a maximum available raw data bandwidth of around 80%. In a system as described herein, for a training period of approximately 200 bits, a response window of approximately 300 bits and a JAM window of approximately 100 bits, the maximum available raw data bandwidth is decreased to approximately 57% at message lengths of 800 bits.

Thus, in summary, there has been disclosed a method and apparatus in which the standard CSMA/CD protocol can be utilized with a single wireless communication channel, that is, a medium with capture. Each transmitting station 12 can detect that its transmission is invalid, and generate a collision detect signal. Also, even a station which has captured the medium is informed if its transmission has collided with another transmission, such that a collision detect signal can be provided for such a station. Such a station may be subject to backoff or, in accordance with the aforementioned modified arrangement, may be permitted to continue with its (successful) transmission. Thus, the standard CSMA/CD protocol can be applied. A further advantage of the described system is that no central control station (distribution system) is utilized. Also, the implementation can be effected in cost-effective digital logic. Although, as discussed above, there is some performance degradation, the degree of such degradation is generally acceptable.

One aspect of this invention may be summarized in claim-like language as follows;

In a wireless local area network (LAN) including a plurality of stations (12) operating on a wireless communication channel (WCC), a method of controlling the operation of said wireless LAN comprising the steps of:
  (a) transmitting over said WCC an initial message portion (43) of a message (40) to be transmitted by a first (transmitting) station (12-1) of said plurality of stations to a second (destination) station (12-2) of said plurality of stations;
  (b) said second station, in response to receiving said initial message portion (43), transmitting a response message (42) over said WCC; and
  (c) said first station (12-1) transmitting over said WCC a predetermined signal if said response message (42) is not received by said first station.

Another aspect of this invention may be summarized in claim-like language as follows:

In a wireless local area network (LAN) including a controller and a plurality of stations (12) operating on a wireless communication channel (WCC), a method of controlling the operation of said wireless LAN comprising the steps of:
  (a) transmitting by a first station (12-1) of said plurality of stations over said WCC an initial message portion (43) including a training portion, an address of said first station, and an address of a second station in said plurality of stations designated for receiving said initial message portion; and
  said first station (12-1)
  (b) checking a response message (42) transmitted by said second station (12-2) and received by said first station (12-1) in a first time period (53) following the transmission of said initial message portion (43) to determine if said response message (42) is identical to said initial message portion (43); and
  said first station
  (c) remaining in a receive mode during a second time period (65) following said first time period (53) if said response message is identical to said initial message portion, permitting said first station to detect a jam pattern (64) transmitted by other stations in said plurality of stations during second period (65).

What is claimed is:

1. In a wireless local area network, hereinafter referred to as LAN, including a plurality of stations operating on a single wireless communication channel, hereinafter referred to as WCC, a method of controlling the operation of said wireless LAN comprising the steps of:
  (a) transmitting in a first time interval over said single WCC an initial message portion of a message to be transmitted by a first (transmitting) station of said plurality of stations to a second (destination) station of said plurality of stations, said initial message portion containing a destination address of said second station and a sending address of said first station;
  (b) said second station, in response to receiving said initial message portion, transmitting in a second time interval following said first time interval a response message over said single WCC, said response message containing said destination address of said second station and said sending address of said first station;
  (c) said first station transmitting over said single WCC a jam pattern in a third time interval following said second time interval if said response message is not received by said first station; and
  (d) said first station remaining in a receive mode during said third time interval if said response message is identical to said initial message portion, enabling said first station to detect a jam pattern transmitted by other stations in said plurality of stations during said third time interval.

2. The method as claimed in claim 1 in which said message also includes a remaining portion in addition to said initial message portion, and in which said first station also includes the step of:
  (e) preventing the transmission of said remaining portion by said first station if a jam pattern transmitted by other stations in said LAN is detected by said first station in said third time interval.

3. The method as claimed in claim 1 in which said message also includes a remaining portion in addition to said initial message portion, and in which said first station is effective for:
  (d) transmitting said remaining portion by said first station if said response message is received by said first station during said second time interval and no jam pattern is transmitted by other stations in said plurality of stations during said third time interval.

4. The method as claimed in claim 1 in which said jam pattern is effected by repeating an on-off carrier signal pattern by said first station if said response message is not received by said first station.

5. In a wireless local area network, hereinafter referred to as LAN, including a plurality of stations operating on a single wireless communication channel, hereinafter referred to as WCC, a method of controlling the operation of said wireless LAN comprising the steps of:
  (a) transmitting in a first time interval over said single WCC an initial message portion of a message to be transmitted by a first (transmitting) station of said plurality of stations to a second (destination) station of said plurality of stations, said initial message portion containing a destination address of said second station and a sending address of said first station;
  (b) said second station, in response to receiving said initial message portion, transmitting in a second time interval following said first time interval a response message over said single WCC, said response message containing said destination address of said second station and said sending address of said first station;

(c) said first station transmitting over said single WCC a jam pattern in a third time interval following said second time interval as a result of comparing the destination address of said second station and the sending address of said first station in said initial message portion and said response message and finding a difference between the destination and sending addresses; and (d) said first station remaining in a receive mode during said third time interval if said response message is identical to said initial message portion, enabling said first station to detect a jam pattern transmitted by other stations in said plurality of stations during said third time interval.

6. A wireless local area network, hereinafter referred to as LAN, comprising:

a plurality of wireless LAN stations having operating means for operating over a wireless communication channel, hereinafter referred to as WCC, in said LAN for sending and transmitting a message thereover;

said message including an initial message portion and a remaining message portion;

said initial message portion including a sending address of a first station and a destination address of a second station in said plurality of wireless LAN stations;

said operating means comprising:

a modem means for said first station of said plurality of said wireless LAN stations for transmitting said initial message portion over said WCC in a first time interval; and a modem means for said second station of said plurality of said wireless LAN stations for receiving said initial message portion over said WCC and for transmitting a response message over said WCC in a second time interval following said first time interval;

said response message including the sending address of said first station and the destination address of said second station;

said modem means of said first station transmitting a jam pattern over said WCC in a third time interval following said second time interval if said response message is not received by said first station, and said modem means of said first station remaining in a receive mode during said third time interval if said response message is identical to said initial message portion to enable said first station to detect a jam pattern transmitted by other stations in said plurality of stations during said third time interval.

7. In a wireless local area network, hereinafter referred to as LAN, including a plurality of stations operating on a wireless communication channel, hereinafter referred to as WCC, a method of controlling the operation of said wireless LAN comprising the steps of:

(a) transmitting in a first time period by a first station of said plurality of stations over said WCC an initial message portion including a training portion, an address of said first station, and an address of a second station in said plurality of stations designated for receiving said initial message portion; and said first station (b) checking a response message transmitted by said second station and received by said first station in a second time period following the transmission of said initial message portion in said first time period to determine if said response message is identical to said initial message portion; and said first station (c) remaining in a receive mode during a third time period following said second time period if said response message is identical to said initial message portion, permitting said first station to detect a jam pattern transmitted by other stations in said plurality of stations during said third time period.

8. The method as claimed in claim 7 in which said method includes the steps of:

(d) initiating a collision detect signal by said first station when a jam pattern is detected in said third time period; and (e) preventing transmitting of a remaining message portion by said first station in response to said collision detect signal; and (f) repeating said transmitting step (a) by said first station after a random back-off period.

* * * * *